(12) United States Patent
Suzuki et al.

(10) Patent No.: US 7,480,998 B2
(45) Date of Patent: Jan. 27, 2009

(54) BUSH CUTTER

(75) Inventors: Toshiyuki Suzuki, Tokyo (JP); Kenichi Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/430,270

(22) Filed: May 8, 2006

(65) Prior Publication Data
US 2006/0248731 A1 Nov. 9, 2006

(30) Foreign Application Priority Data

| May 9, 2005 | (JP) | ............................. 2005-136496 |
| May 11, 2005 | (JP) | ............................. 2005-138562 |
| May 13, 2005 | (JP) | ............................. 2005-141396 |
| May 13, 2005 | (JP) | ............................. 2005-141397 |

(51) Int. Cl.
*B26B 7/00* (2006.01)

(52) U.S. Cl. .......................................... 30/276; 56/255

(58) Field of Classification Search .................... 30/276, 30/380–387; 56/16.7, 255–256
See application file for complete search history.

(56) References Cited

U.S. PATENT DOCUMENTS

| 4,887,415 A | * | 12/1989 | Martin | ...................... 56/10.2 R |
| 5,357,738 A | * | 10/1994 | Griffiths | ...................... 56/17.5 |
| 6,301,788 B1 | * | 10/2001 | Webster | ........................ 30/276 |
| 6,871,484 B1 | * | 3/2005 | Sartain | ........................ 56/12.7 |
| 2002/0007559 A1 | * | 1/2002 | Morabit et al. | ................. 30/276 |
| 2005/0064973 A1 | * | 3/2005 | Schroeder et al. | ........... 474/174 |

FOREIGN PATENT DOCUMENTS

| JP | 5-2620 | 1/1993 |
| JP | 2004008054 | 1/2004 |

* cited by examiner

*Primary Examiner*—Maurina Rachuba
(74) *Attorney, Agent, or Firm*—Smith, Gambrell & Russell

(57) ABSTRACT

A cutter is coupled to a tip of a driven shaft rotatably attached in an operating arm as a main body of a bush cutter, and the other end thereof is provided to a driven side coupling portion selectively coupled with any one of a driving side coupling portion of an engine output shaft and a driving side coupling portion of a motor output shaft. To a driven side joint provided in the other end of the operating arm, any one of an engine output side joint of an engine and an engine output side joint of an electric motor is selectively detachably attached. An engine revolution regulator is connected to the engine through a cable, a motor revolution regulator is connected to the electric motor through an electric cord, and these regulators are detachably attached to a handle of the operating arm.

25 Claims, 15 Drawing Sheets

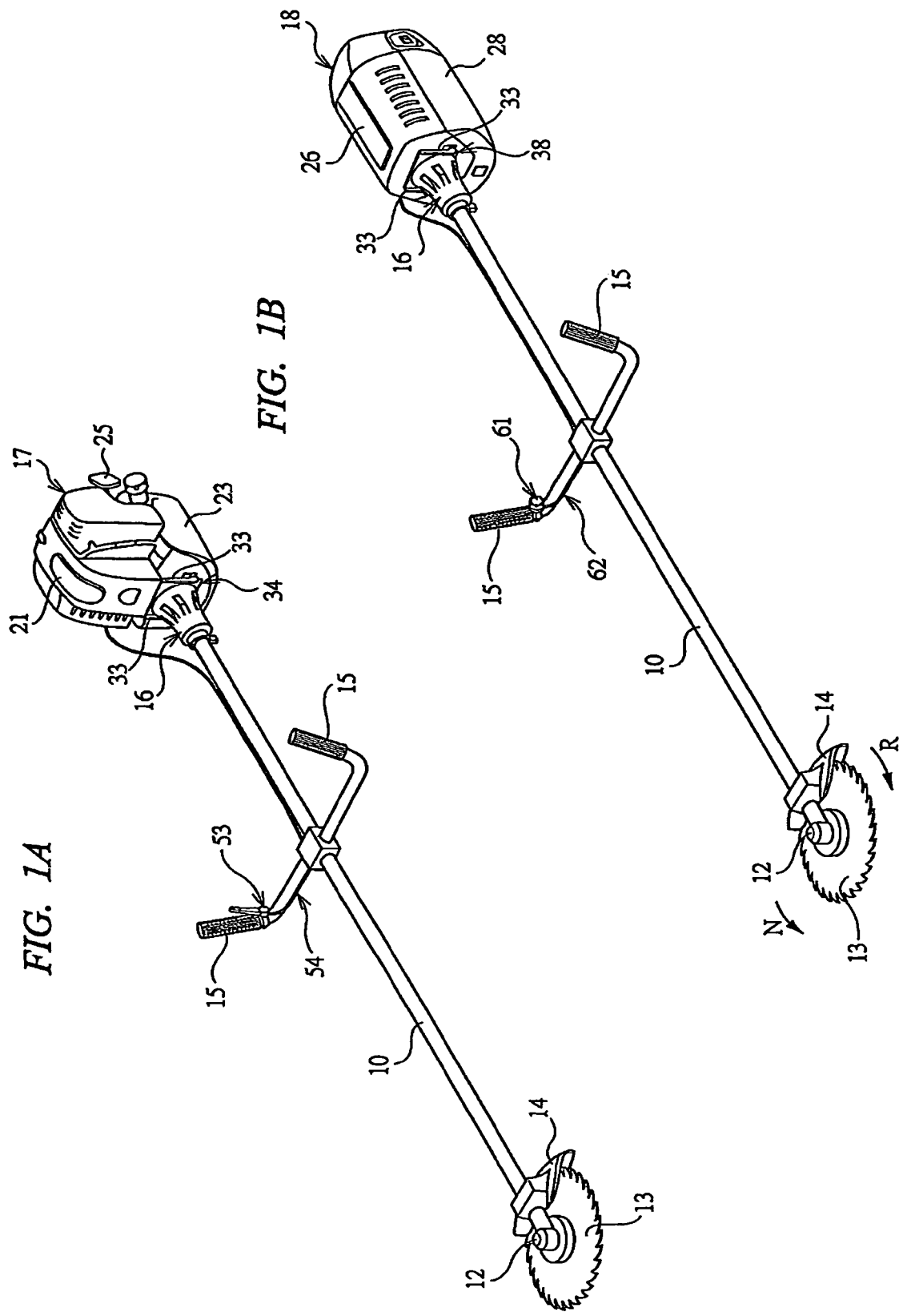

BUSH CUTTER

CROSS-REFERENCE TO RELATED APPLICATION

The entire disclosures of Japanese Patent Applications No. 2005-141396 filed on May 13, 2005, No. 2005-141397 filed on May 13, 2005, No. 2005-136496 filed on May 9, 2005, and No. 2005-138562 filed on May 11, 2005 each including specification, claims, drawings and summary, on each of which the Convention priority of the present application is based, are incorporated herein by reference in its entirety.

BACKGROUND OF THE INVENTION

The present invention relates to a bush cutter capable of driving a cutter with any of an engine and an electric motor used as a power source.

In order to mow weeds sprouting in paths between fields or on riversides, bottom weeds of forest lands, meadow grass, or the like, a bush cutter also referred to as a lawn mower is used. The bush cutter includes an arm coupling type in which a cutter is mounted on a tip of an operating arm and a power source is attached to a rear end thereof, and a direct driving type in which the cutter is directly mounted on a rotational shaft of the power source. As a power source, there are the case of attaching an engine and the case of attaching an electric motor.

In the bush cutter with the electric motor used as a power source, there are a numerous of direct driving types, in each of which the electric motor is attached to the tip of the operating arm and the cutter is directly attached to the shaft of the electric motor. In the bush cutter with the engine used as a power source, there are a numerous of arm coupling types, in each of which the cutter is mounted on the tip of the operating arm and the engine is attached to the rear end thereof.

In the arm coupling type in which the cutter is mounted on the tip of the operating arm and the engine is attached to the rear end, there are a carrying type of mounting the engine on a carrying stand, a shoulder type of hanging, on a shoulder, a loop belt mounted on the operating arm, a handle type of gripping by hand and operating a handle provided to the operating arm, and the like. The handle includes a loop handle and a two-handed handle.

In the bush cutter with the electric motor used as a power source, there are a power supply connection type of being used by connecting a power supply connector to a commercial power supply terminal and a battery mounting type of mounting a battery. In the case of the power supply connection type, it can be used when the commercial power source terminal exists at a position relatively close to a place for use. However, at a position where no power supply terminal exists, it cannot be used as it is and requires a generator when it is used. On the other hand, in the case of the bush cutter of the battery mounting type, since there is a limit to battery capacity, an operation to exchange or charge the battery is required. In contrast to this, the bush cutter with the engine used as a power source can be used even when no commercial power supply terminal exists at the position relatively close to the place for use, and furthermore, it has an advantage of being able to operate for a long time by replenishing fuel. However, engine noises during an operating time become louder than those during the motor driving.

SUMMARY OF THE INVENTION

Thus, although the bush cutter of the electric motor type does not generate louder noises, the place for use thereof is limited in the case of using the commercial power supply and the operation to exchange or charge the battery is required in the case of using the battery. In contrast to this, the bush cutter of the engine type can be used for a long time even in the case of not being near the power supply terminal, e.g., when bottom grass of forest lands or meadow grass is mowed. However, in the case of performing weed mowing operations in areas where residential houses are dense, noises are also propagated to neighboring residents. Although the user of the bush cutter selects either the electric motor type or the engine type according to use environment, the use environment is limited depending on the driving source.

An object of the present invention is to allow the bush cutter to be driven also by any of the engine and the electric motor used as a driving source according to the use environment.

A bush cutter according to the present invention is a bush cutter for cutting grass by rotating a cutter, which comprises: a main body of the bush cutter; a holder mounted on the main body and rotatably supporting the cutter; a driven shaft rotatably supported to the main body and coupled to the cutter; a driven side joint mounted on the main body and detachably attached to any one of an engine output side joint provided in an engine case accommodating an engine and a motor output side joint provided in a motor case accommodating an electric motor; a driven side coupling member coupled to the driven shaft in the driven side joint and coupled to any one of a driving side coupling member of the engine provided in an output shaft of the engine and a driving side coupling member of the motor provided to an output shaft of the electric motor; and a detachable and attachable accessory part provided so as to correspond to the engine or electric motor selectively mounted and assisting its driving.

The bush cutter according to the present invention is such that the accessory part is a battery attached at a time of selectively mounting the electric motor on the main body of the bush cutter, the battery driving the electric motor.

The bush cutter according to the present invention is such that the battery is attached to the electric motor in a sliding manner.

The bush cutter according to the present invention is such that the accessory part is an engine revolution regulator attached at a time of selectively mounting the engine on the main body of the bush cutter, the engine revolution regulator being coupled to a throttle of the engine and capable of regulating the number of regulations of the engine.

The bush cutter according to the present invention is such that the engine revolution regulator is detachably attached to the main body of the bush cutter and is coupled to the throttle by a cable.

The bush cutter according to the present invention is such that the engine revolution regulator comprises a holder detachably attached to the main body of the bush cutter and a lever swingably supported to the holder and connected to the cable.

The bush cutter according to the present invention is such that the accessory part is a motor revolution regulator attached at a time of selectively mounting the electric motor on the main body of the bush cutter, the motor revolution regulator being coupled to the electric motor and capable of regulating the number of revolutions of the electric motor.

The bush cutter according to the present invention is such that the motor revolution regulator is detachably attached to the main body of the bush cutter and is coupled to the electric motor by an electric cord.

The bush cutter according to the present invention is such that the motor revolution regulator comprises a holder detachably attached to the main body of the bush cutter; an operating member movably supported by the holder; and a variable resistor operated by the operating member and changing a driving current supplied from a power source to the electric motor.

The bush cutter according to the present invention is such that the cutter has a blade of a double blade type, and the accessory part is a selector switch attached at a time of selectively mounting the electric motor on the main body of the bush cutter, the selector switch changing a rotational direction of the electric motor.

The bush cutter according to the present invention is such that the selector switch is detachably attached to a handle of the main body of the bush cutter, and is coupled to the electric motor through an electric cord.

The bush cutter according to the present invention is such that the accessory part is a selector switch attached at a time of selectively mounting the electric motor on the main body of the bush cutter, the selector switch reversing the electric motor when the cutter is locked.

The bush cutter according to the present invention is such that the selector switch is detachably attached to the handle of the bush cutter, and is coupled to the electric motor through the cable.

According to the present invention, since any one of the engine and the electric motor is attached to the main body of the bush cutter, the cutter of the bush cutter can be driven by the engine and can be driven also by the electric motor. Consequently, by preparing each of the engine and the electric motor as an attachment, the bush cutter can be used as any one of an engine driving type and an electric motor driving type according to the use environment of the cutting operations. Further, a user who has purchased the main body of the bush cutter and the engine or electric motor as one set can switch the bush cutter from the electric motor type to the engine driving type or from the engine driving type to the electric motor driving type by additionally purchasing the electric motor or engine.

According to the present invention, since an accessory part such as a battery for driving the electric motor, an engine revolution regulator provided in the engine, a motor revolution regulator provided in the electric motor, and the like can be detachably attached so as to correspond to the selectively mounted engine or electric motor, so that the operation for attaching the engine or electric motor to the main body of the bush cutter can be made easy.

According to the present invention, since the battery to drive the electric motor is attached to the electric motor in a sliding manner, the battery can be taken out from the electric motor and charged as a simple body, whereby the charging operation of the battery can be made easy.

According to the present invention, since the engine revolution regulator is coupled to the throttle of the engine by the cable, an initial setting of the engine revolution regulator can be made unnecessary when the main body of the bush cutter is attached to the engine. For example, when the main body of the bush cutter is attached to the engine, the regulation of the idling revolution of the engine by the engine revolution regulator is made unnecessary, so that the attaching operation of the engine to the main body of the bush cutter can be made easy.

According to the present invention, since the motor revolution regulator is coupled to the electric motor by the electric cord, when the main body of the bush cutter is attached to the electric motor, the initial setting of the motor revolution regulator can be made unnecessary. For example, when the electric motor is attached to the main body of the bush cutter, there is no need to couple the motor revolution regulator and the electric motor, so that a connection failure between the motor revolution regulator and the electric motor can be prevented.

According to the present invention, when the cutter is driven by the electric motor, a cutter having a double edged type blade is attached to the main body of the bush cutter and, by operating the selector switch, the cutter is selectively rotated in any of the forward direction and the reverse direction, so that a blowing direction of mowed grass can be set on the left or right hand. Consequently, for example, when weed sprouting in the slope such as a riverside is mowed off while a worker moves along the riverside, the rotational direction of the cutter can be reversed in performing mowing operations in a left-down state and a right-down state. By so doing, even if the worker continues to perform the mowing operation by turning a worker's body reversely, the mowing operation for continuously blowing off the mowed grass on a lower side of the riverside can be performed.

According to the present invention, when the mowed grass and the like are entangled into the cutter to lock the cutter while driving the cutter by the electric motor, the electric motor is reversed by operating the selector switch, so that the mowed grass and the like entangled into the cutter can be easily removed.

According to the present invention, since the selector switch is coupled to the electric motor by the electric cord, when the electric motor is attached to the main body of the bush cutter, the initial setting of the selector switch can be made unnecessary. For example, when the electric motor is attached to the main body of the bush cutter, there is no need to couple the selector switch and the electric motor, so that a connection failure between the selector switch and the electric motor can be prevented.

BRIEF DESCRIPTION OF THE DRAWINGS

FIG. 1A is a perspective view showing a bush cutter according to one embodiment of the present invention and shows a state of attaching an engine to a main body of the bush cutter;

FIG. 1B is a perspective view showing the bush cutter according to one embodiment of the present invention and shows a state of attaching an electric motor to the main body of the bush cutter;

DESCRIPTION OF THE PREFERRED EMBODIMENTS

Figure 2A:
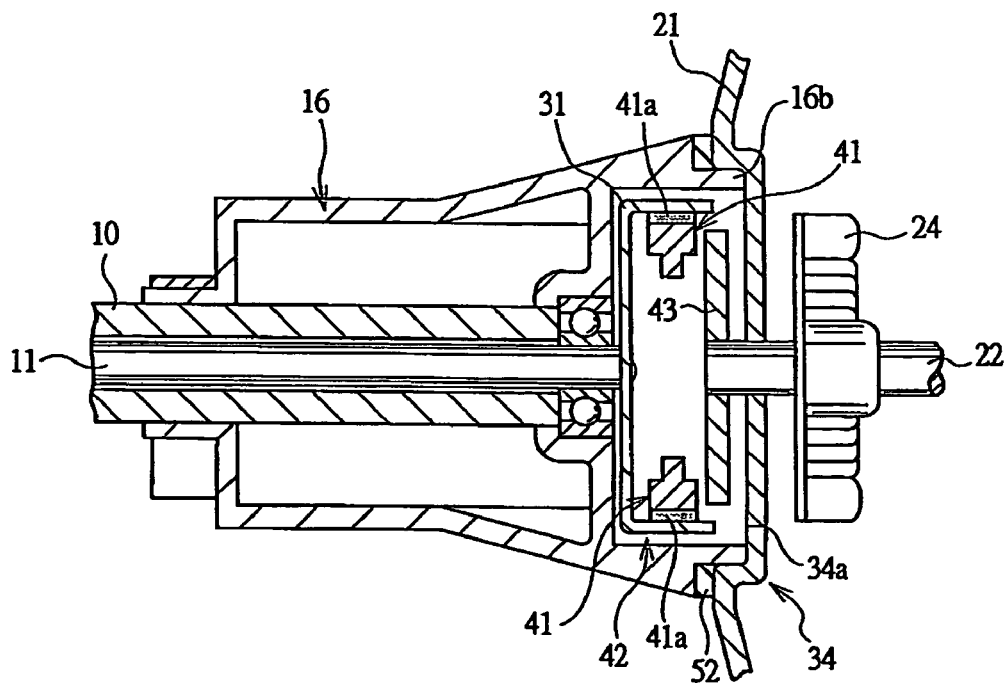
FIG. 2A is an enlarged sectional view showing a coupling portion of a driven side joint and an engine output side joint.
Figure 2B:
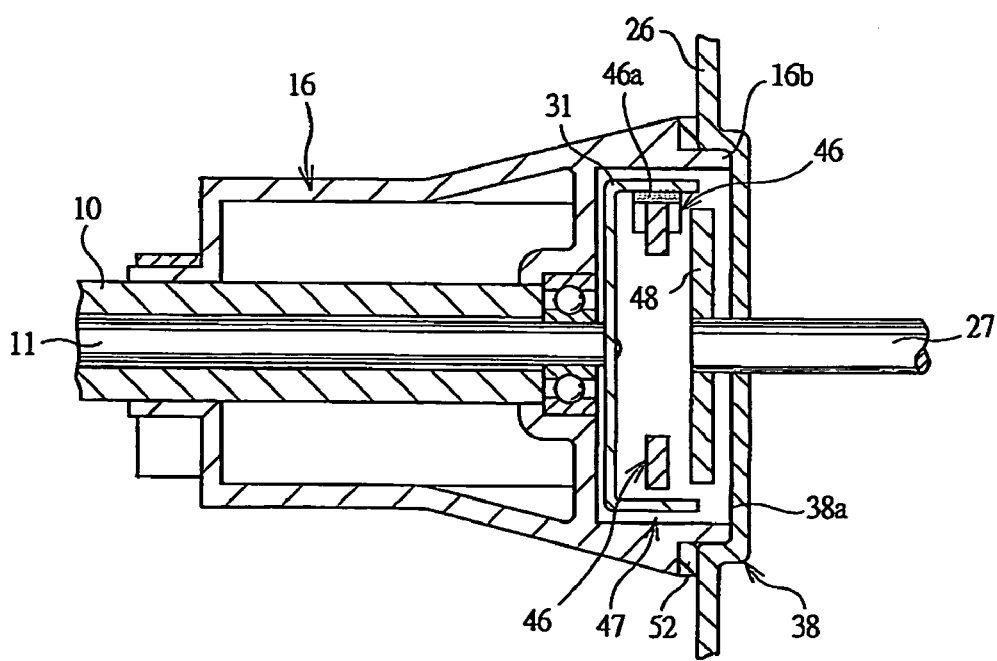
FIG. 2B is an enlarged sectional view showing a coupling portion of the driven side joint and a motor output side joint.

A bush cutter shown in FIG. 1 is an arm coupling type, and has an operating arm 10 as a main body of the bush cutter. The operating arm 10 is constructed by a hollow bar-shaped member and, in the arm, a driven shaft 11 is rotatably supported as shown in FIGS. 2A and 2B. A holder 12 is mounted on a tip of the operating arm 10 and a disk-shaped metal cutter 13, on whose outer circumferential surface a number of saw-toothed blades are formed, is rotatably mounted to the holder 12. The cutter 13 is coupled to a tip of the driven shaft 11 through a bevel gear pair (omitted in Figures). A cover 14 is mounted on the tip of the operating arm 10 so as to cover a part of the cutter 13, so that safety of the operation is achieved. Note that as the cutter 13, a cutter composed of a plurality of cords extending radially from a rotation center may be used instead of the illustrated disk-shaped metal cutter.

Two handles 15 are mounted at a longitudinal-directional center portion of the operating arm 10, so that a worker grips the handles 15 by both hands and thereby can perform a mowing operation of grass. Note that, in the case of being illustrated, the bush cutter is used as a both handle type by mounting the two handles 15 on the operating arm 10, but may be used as a loop handle type instead of the both handle type. Alternatively, by mounting a loop-shaped shoulder belt on the operating arm 10, the bush cutter may be used as a shoulder type.

A joint on a bush cutter side, that is, a driven side joint 16 is mounted on a rear end of the operating arm 10. The operating arm 10 is allowed to be selectively and detachably attached to any of an engine 17 as shown in FIG. 1A and an electric motor 18 as shown in FIG. 1B at a portion of the driven side joint 16.

Figure 3A:
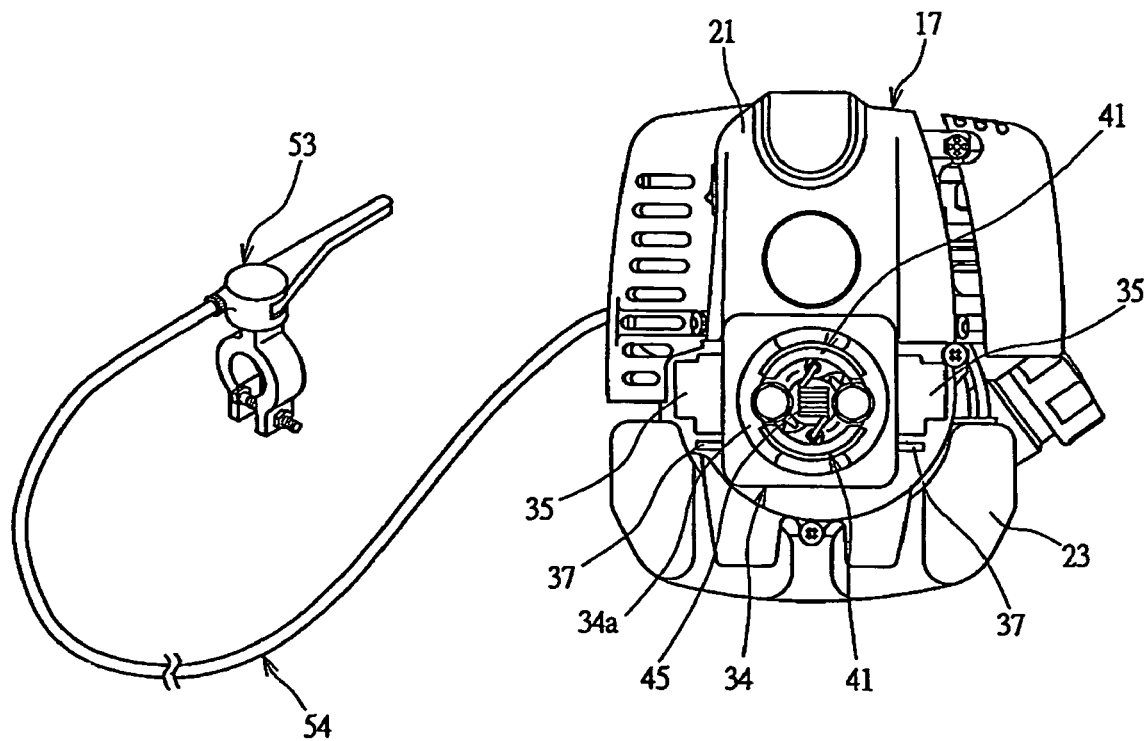
FIG. 3A is a front view showing details of the engine.

As shown in FIG. 3A, a four-cycle single cylinder gasoline engine is used as the engine 17. Inside an engine case 21 a crank case of the engine 17 is provided for rotatably supporting an engine output shaft 22 equivalent to a crank shaft shown in FIG. 2A, and incorporates a cylinder and a piston (omitted in Figures), whereby the engine output shaft 22 is rotationally driven by using gasoline in a fuel tank 23 as fuel. As shown in FIG. 2A, a cooling fan 24 is mounted on the engine output shaft 22 and when the engine 17 is operated, cooling air for cooling the engine 17 is generated. In order to start the engine 17 by rotating the engine output shaft 22 by hand, a recoil starter is provided, and by pulling a recoil knob 25 shown in FIG. 1A, the engine 17 can be started.

Figure 3B:
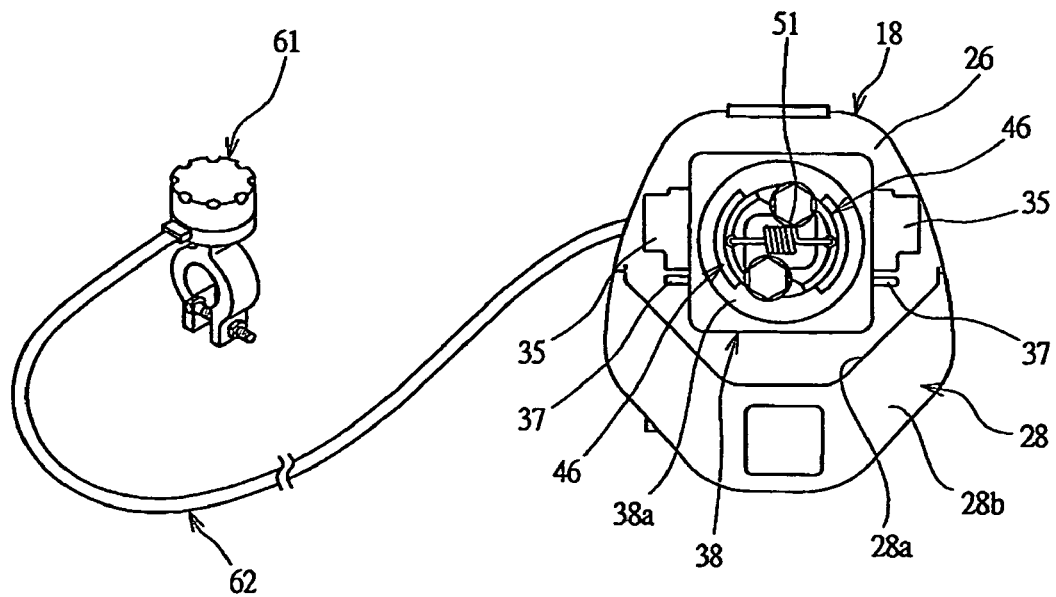
FIG. 3B is a front view showing details of the electric motor.

As shown in FIG. 3B, the electric motor 18 has a motor case 26 with an approximately hexagonal column shape, and a motor output shaft 27 comprising an armature shaft shown in FIG. 2B is rotatably supported to the motor case 26. Inside the motor case 26 is incorporated a motor constituent member (omitted in Figures) such as an armature fixed to the motor output shaft 27, a magnet opposed to the armature, and the like. Further, to the outer circumferential portion of the electric motor 18, a battery 28 as power supply is attached. This battery 28 is, for example, a rechargeable type such as a lithium-ion battery and the like, and the electric motor 18 is driven by the electric power supplied from the battery 28. That is, when the electric motor 18 is mounted to the operating arm 10, the battery 28 becomes an accessory part corresponding to the relevant electric motor 18 and attached to the bush cutter, so that by this battery 28, the driving of the electric motor 18 is assisted.

Figure 4:
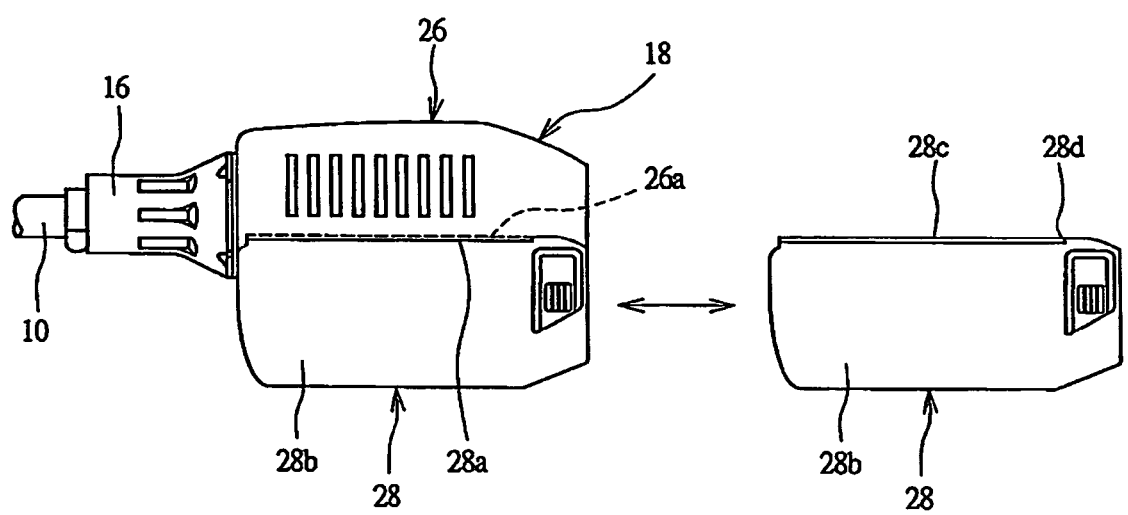
FIG. 4 is an explanatory view showing attachment procedure of a battery to the electric motor.

As shown in FIG. 3B and FIG. 4, the battery 28 has a cross section vertical to an axial direction and formed in an approximately V character along an outer circumferential portion of the motor case 26. An inner side face 28a of the battery 28 is opposed to three lower faces of the motor case 26, and an outer side face 28b thereof is formed so as to stretch to both side faces of the motor case 26. In both V-shaped tip portions of the battery 28, that is, a boundary portion of the inner side face 28a and the outer side face 28b, engaging grooves 28c extending axially is formed. A pair of rail portions 26a as engaging portions engaged with these engaging groves 28c are formed so as to extend in parallel with the output shaft 27 at lower end portions of both side faces of the motor case 26. The rail portions 26a of the motor case 26 are engaged with the engaging grooves 28c of the battery 28 and when the battery 28 is slid axially with respect to the electric motor 18 until the stoppers 28d formed in end portions of the engaging grooves 28c abut against the end portions of the rail portions 26a, the battery 28 is attached to the outer circumferential portion of the electric motor 18. When the battery 28 is attached to the electric motor 18, a feeding terminal (omitted in Figures) of the battery 28 is connected to a power supply terminal (omitted in Figures) provided in the electric motor 18 and a driving current is supplied to the electric motor 18 from the battery 28. Further, by allowing the battery 28 to be slid in a direction reverse to an attachment direction, the battery 28 can be removed from the electric motor 18. Thus, the battery 28 is detachably attached to the outer circumferential portion of the electric motor 18 in a sliding manner and when the battery 28 is charged, the battery 28 is removed from the electric motor 18 and charged by an unshown battery charger.

Thus, in this bush cutter, since the battery 28 for driving the electric motor 18 is detachably attached to the outer circumferential portion of the electric motor 18, the battery 28 is removed from the electric motor 18 and can be charged, so that a charging operation of the battery 28 can be easily performed. Further, the battery 28 is attached to on the outer circumferential portion of the electric motor 18 in such a sliding manner as to be along the axial direction of the output shaft 27, so that even if the battery 28 is attached, a position of gravitational center of the electric motor 18 does not change in the axial direction with respect to the driven shaft 11 and the operability of the bush cutter can be enhanced. Further, since the battery 28 is formed into an approximately V-character in cross section along the outer circumferential portion of the electric motor 18, a position of gravitational center of the battery 28 and a position of gravitational center of the electric motor 18 are close to each other in a radial direction, so that the operability of the bush cutter can be further enhanced.

Figure 5A:
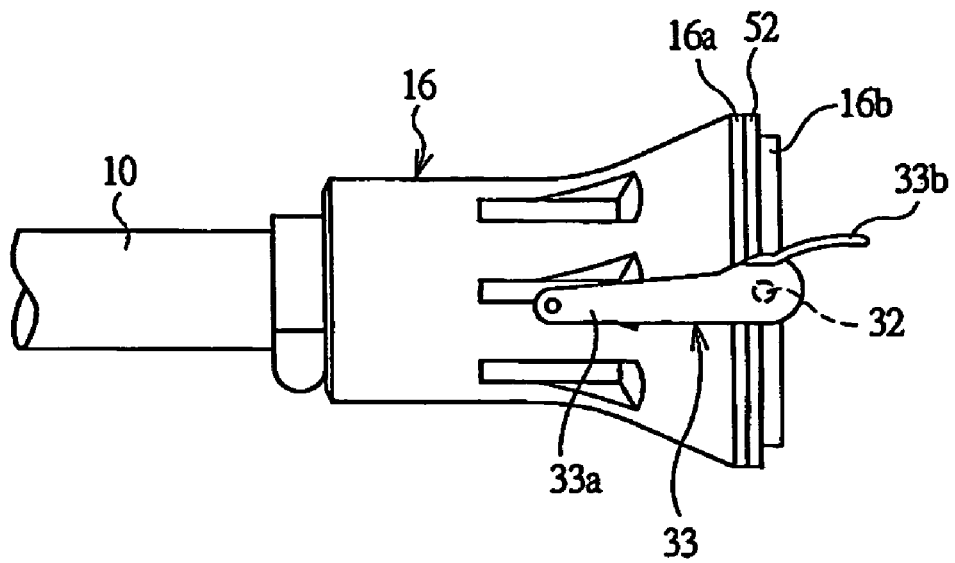
FIG. 5A is a side view showing details of the driven side joint.
Figure 5B:
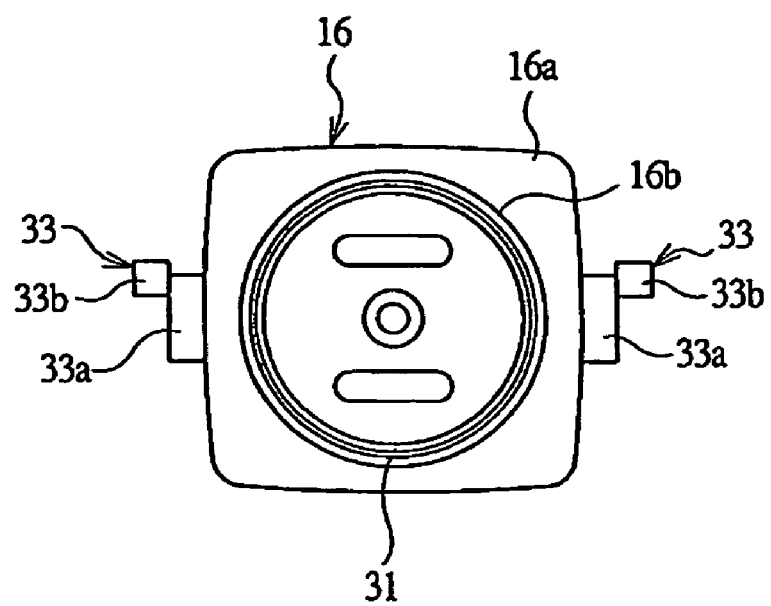
FIG. 5B is a front view of the driven side joint shown in FIG. 5A.

As shown in FIG. 5A, the driven side joint 16 is formed in a shape of a cup larger in diameter than the operating arm 10 and is fixed to the rear end portion of the operating arm 10. As shown in FIG. 5B, a clutch drum 31 as a driven side coupling member is incorporated in the driven side joint 16 and, as shown in FIGS. 2A and 2B, this clutch drum 31 is coupled to the driven shaft 11 inside the driven side joint 16 and when the clutch drum 31 is rotated, the driven shaft 11 is also rotated. Further, an opening end of the driven side joint 16 is provided with a square-shaped flange portion 16a, and a pair of fastening levers 33 as fastening members are attached to both side portions of this flange portion 16a by pins 32. These fastening levers 33 have lever portions 33a operated by the worker, and fastening arm portions 33b which are offset outside with respect to the lever portions 33a and protrude to an opposite side of the lever portions 33a with respect to the pins 32.

On the other hand, as shown in FIG. 3A, the engine case 21 is provided with an engine output side joint 34 detachably attached to the driven side joint 16. This engine output side joint 34 is provided with an engaging concave portion 34a cylindrically hollowed and, as shown in FIG. 2A, the driven side joint 16 is fitted in the engaging concave portion 34a with a cylindrical inlay 16b provided in the opening end of the driven side joint 16. Further, in the engine case 21, a pair of fastening grooves 35 which are located on both sides of the engine output side joint 34 are formed and, as shown in FIG. 6, these fastening grooves 35 are formed by being bent in an L character shape from the opening portion and a portion on a rear face side of the engine case 21 becomes an engaging face 35a.

Figure 6:
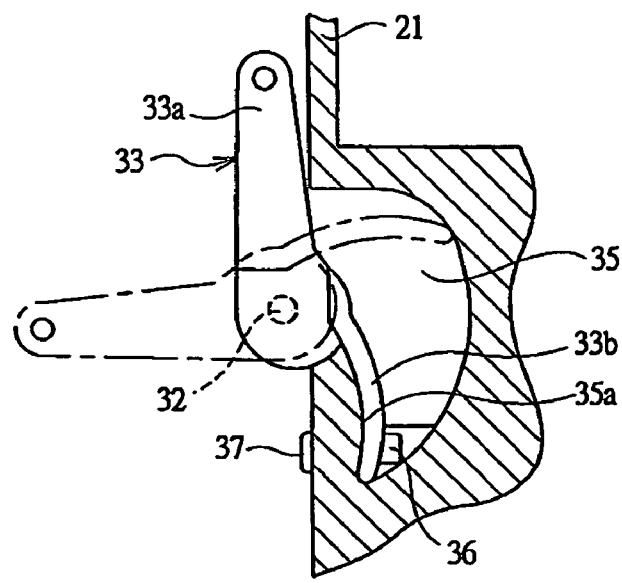
FIG. 6 is a sectional view showing a fastening structure of a fastening groove and a fastening lever.

When the engine output side joint 34 is attached to the driven side joint 16, as shown by a chained line in FIG. 6, the fastening arm portion 33b of the fastening lever 33 located at a releasing position protrudes into the fastening groove 35. From this state, when the fastening lever 33 is rotated in a clockwise direction shown in Figures until the fastening position shown by a solid line in Figures, the fastening arm portion 33b is engaged with the engaging face 35a of the fastening groove 35. Further, a latch 36 is provided inside the fastening groove 35 and when the fastening arm portion 33b is engaged with the engaging face 35a, the latch 36 is engaged with the back face of the fastening arm portion 33b. For this reason, the fastening arm portion 33b is held in a state of being engaged with the engaging face 35a. That is, since the fastening lever 33 provided to the driven side joint 16 is engaged with the latch 36 provided in the engine case 21, the fastening lever 33 is locked at the fastening position and the engine output side joint 34 can be fastened to the driven side joint 16.

The engine case 21 is provided with a lock releasing button 37. When this lock leasing button 37 is depressed, the latch 36 moves outside the fastening groove 35 and the lock of the fastening arm portion 33b by the latch 36 is released accordingly. Therefore, by performing a setting back operation of the fastening lever 33 under a state in which the lock releasing button 37 is depressed, the engagement of the fastening arm portion 33b and the engaging face 35a is released and the engine output side joint 34 can be removed from the driven side joint 16.

As shown in FIG. 3B, the motor case 26 of the electric motor 18 is provided with a motor output side joint 38, which is detachably attached to the driven side joint 16. This motor output side joint 38 is provided with an engaging concave portion 38a, which is cylindrically hollowed, and the driven side joint 16 is fitted in the engaging concave portion 38a with the inlay 16b. Further, in the motor case 26, the fastening grooves 35 located on both sides of the motor output side joint 38 and having the same shape and size as those formed in the engine case 21 are formed, and these fastening grooves 35 are provided with the same engaging surfaces 35a and latch 36 as those provided in the engine case 21. Consequently, by operating the fastening lever 33 of the driven side joint 16 under a state in which the motor output side joint 38 is attached to the driven side joint 16, the fastening arm portion 33b of the fastening lever 33 is engaged with the engaging face 35a of the engaging groove 35, and the latch 36 is engaged with the back face of the arm portion 33b, so that the motor output side joint 38 can be fastened to the driven side joint 16. Further, by performing the setting back operation of the fastening lever 33 under a state in which the lock releasing button 37 provided to the motor case 26 is depressed, the engagement of the fastening arm portion 33b and the engaging face 35a is released, whereby the motor output side joint 38 can be removed from the driven side joint 16.

Thus, the fastening lever 33 provided to the driven side joint 16 is selectively engaged with any of the latch 36 provided to the engine output side joint 34 and the latch 36 provided to the motor output side joint 38. Therefore, even any of the engine output side joint 34 and the motor output side joint 38 can be detachably attached to the driven side joint 16.

As described above, in this bush cutter, by operating the fastening lever 33 provided to the driven side joint 16, the engage output side joint 34 and the motor output side joint 38 can be easily fastened to the driven side joint 16 and, therefore, a detaching/attaching operation of the engine 17 and the electric motor 18 from/to the operating arm 10 serving as the main body of the bush cutter can be easily performed.

Figure 7A:
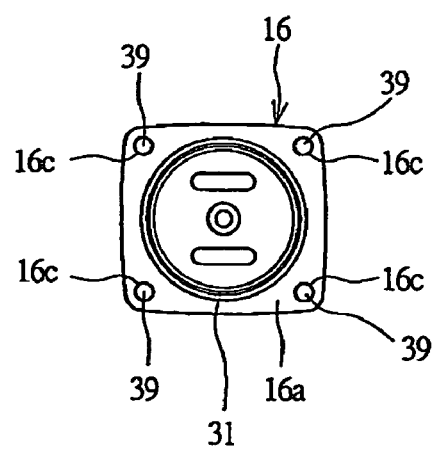
FIG. 7A is a front view showing a modified example of the driven side joint shown in FIG. 5A.
Figure 7B:
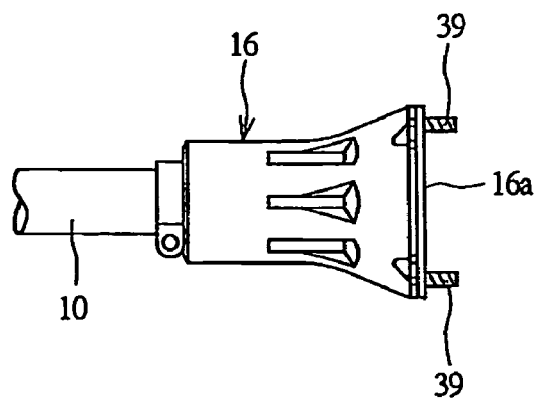
FIG. 7B is a side view of the driven side joint shown in FIG. 7A.
Figure 8A:
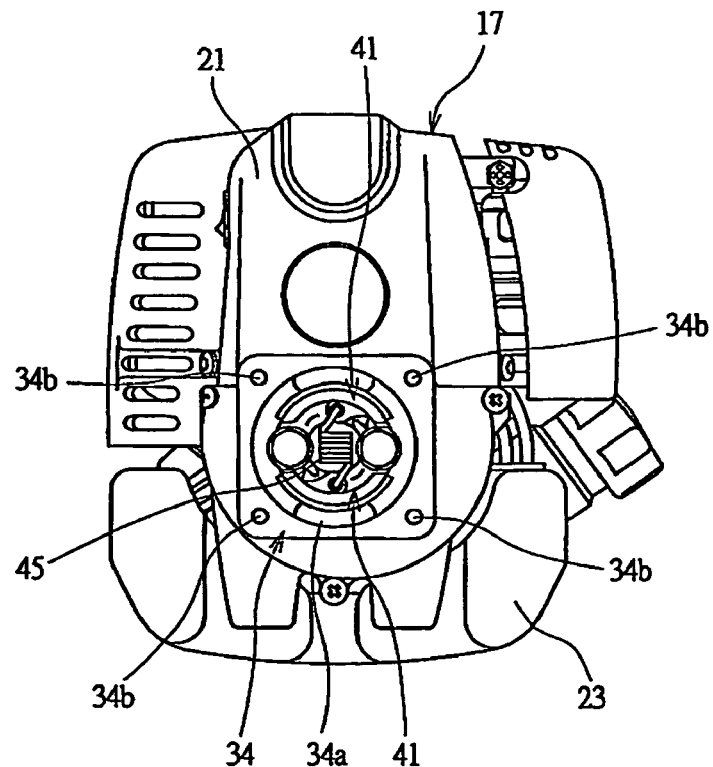
FIG. 8A is a front view showing a modified example of the engine shown in FIG. 3A.
Figure 8B:
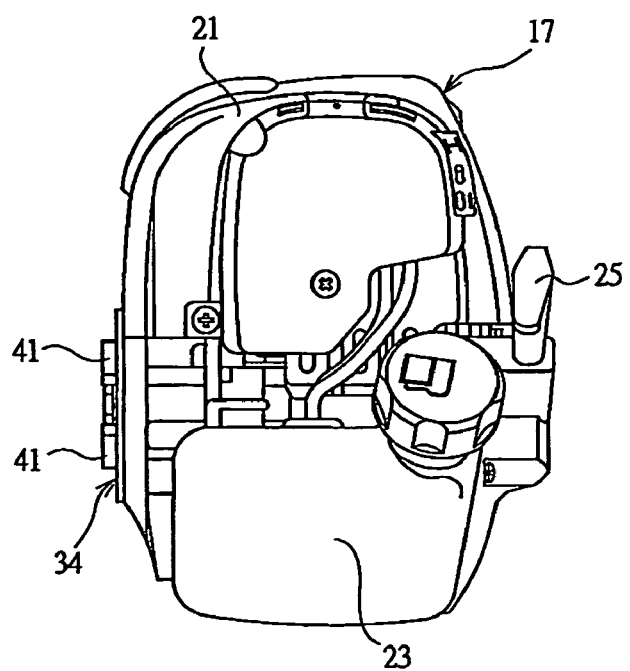
FIG. 8B is a side view of the engine shown in FIG. 8A.
Figure 9A:
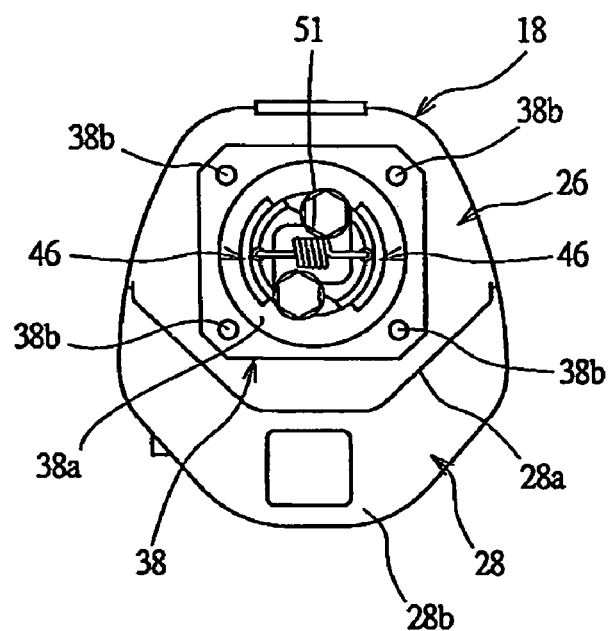
FIG. 9A is a front view showing a modified example of the electric motor shown in FIG. 3B.
Figure 9B:
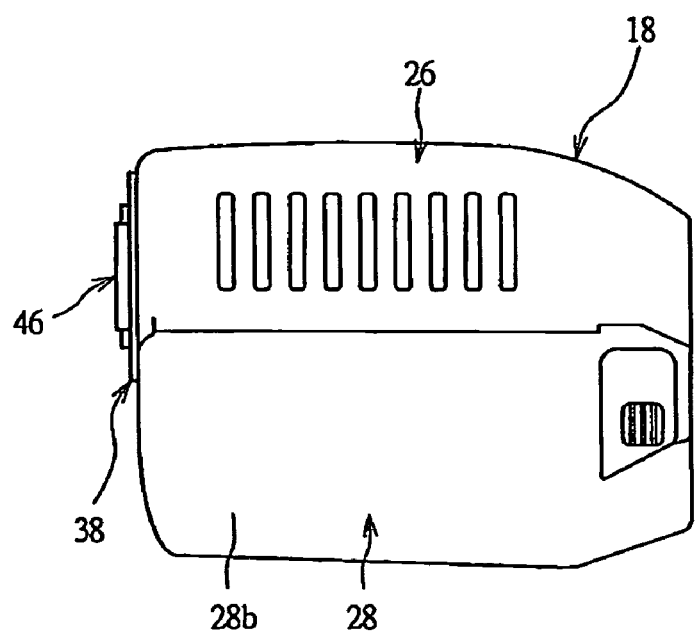
FIG. 9B is a side view of the electric motor shown in FIG. 9A.
Figure 10A:
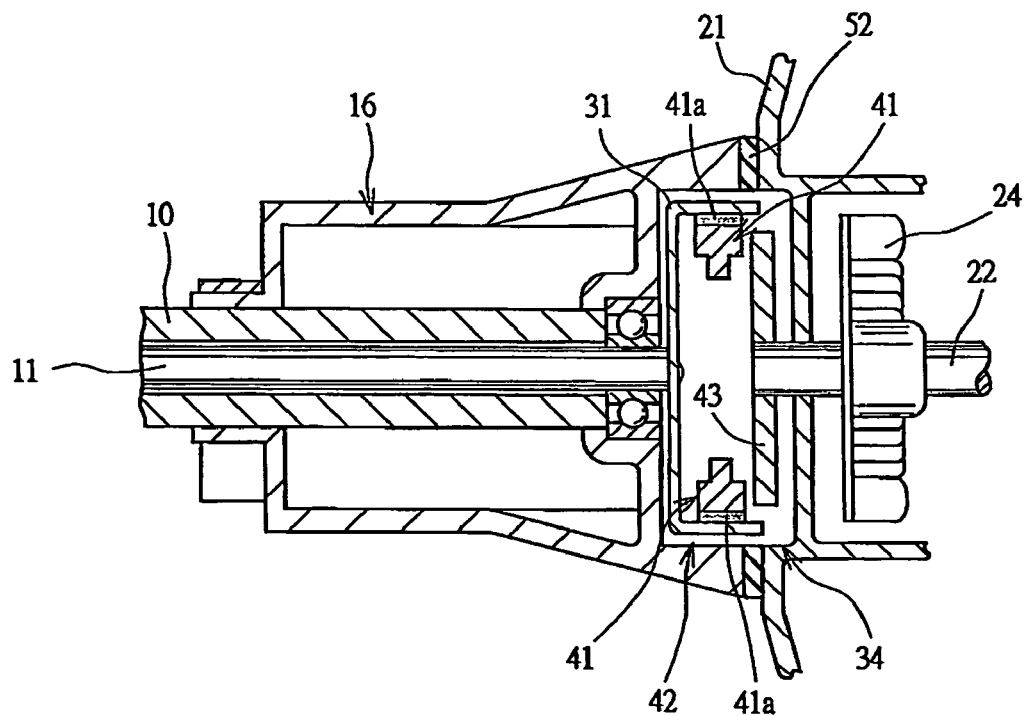
FIG. 10A is an enlarged sectional view showing a coupling portion of the driven side joint and the engine output side joint shown in FIGS. 7A and 7B.
Figure 10B:
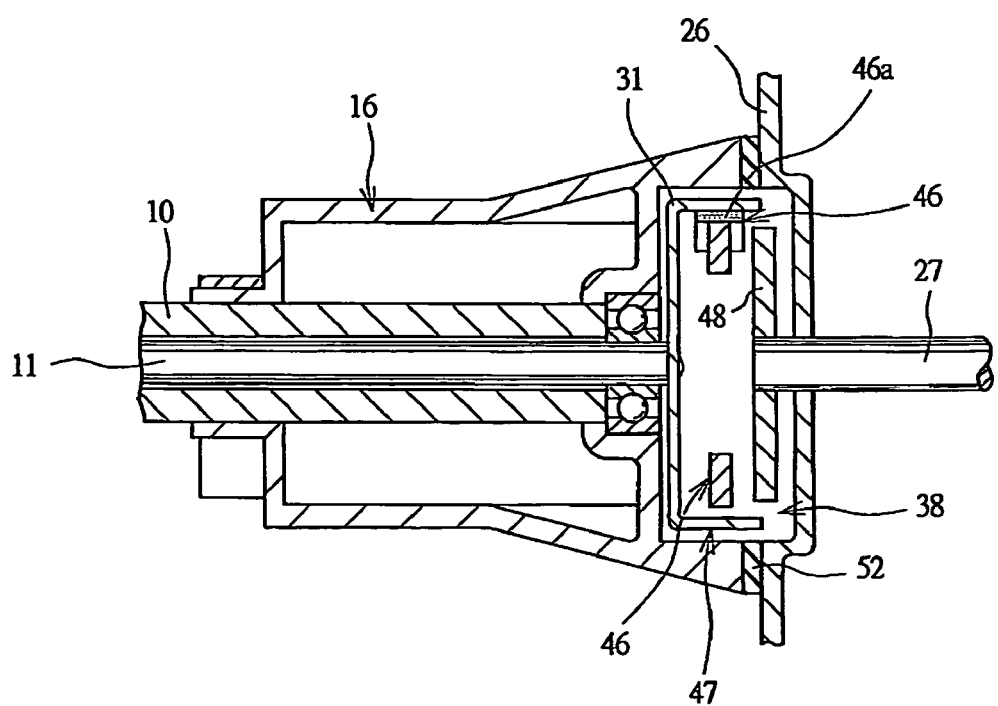
FIG. 10B is an enlarged sectional view showing a coupling portion of the driven side joint and the motor output side joint shown in FIGS. 7A and 7B.

Incidentally, in the present embodiment, the engine output side joint 34 and the motor output side joint 38 are fastened to the driven side joint 16 by the fastening lever 33. However, the present invention is not limited to such joints and may adopt, for example, a structure as shown in FIGS. 7A and 7B, in which each of four corners of the flange portion 16a of the driven side joint 16 is provided with a mounting hole 16c and, by bolts 39 serving as fastening members to be attached to, that is, inserted into these mounting holes 16c, the driven side joint 16 may be fastened to each of the joints 34 and 38. In this case, as shown in FIGS. 8 and 9, in the engine output side joint 34 and the motor output side joint 38, four screw holes 34b and 38b are formed, respectively, and since the bolts 39 attached to the flange portion 16a are screwed to the screw holes 34b of the engine output side joint 34, the driven side joint 16 is fastened to the engine output side joint 34. Since the bolts 39 attached to the flange portion 16a are screwed to the screw holes 38b of the motor output side joint 38, the driven side joint 16 is fastened to the motor output side joint 38. In this case, as shown in FIGS. 10A and 10B, the flange portion 16a of the driven side joint 16 is not provided with a cylindrical inlay, and the driven side joint 16 may be positioned to each of the output side joints 34 and 38 by the bolts 39 and the screw holes 34b and 38b.

Figure 11:
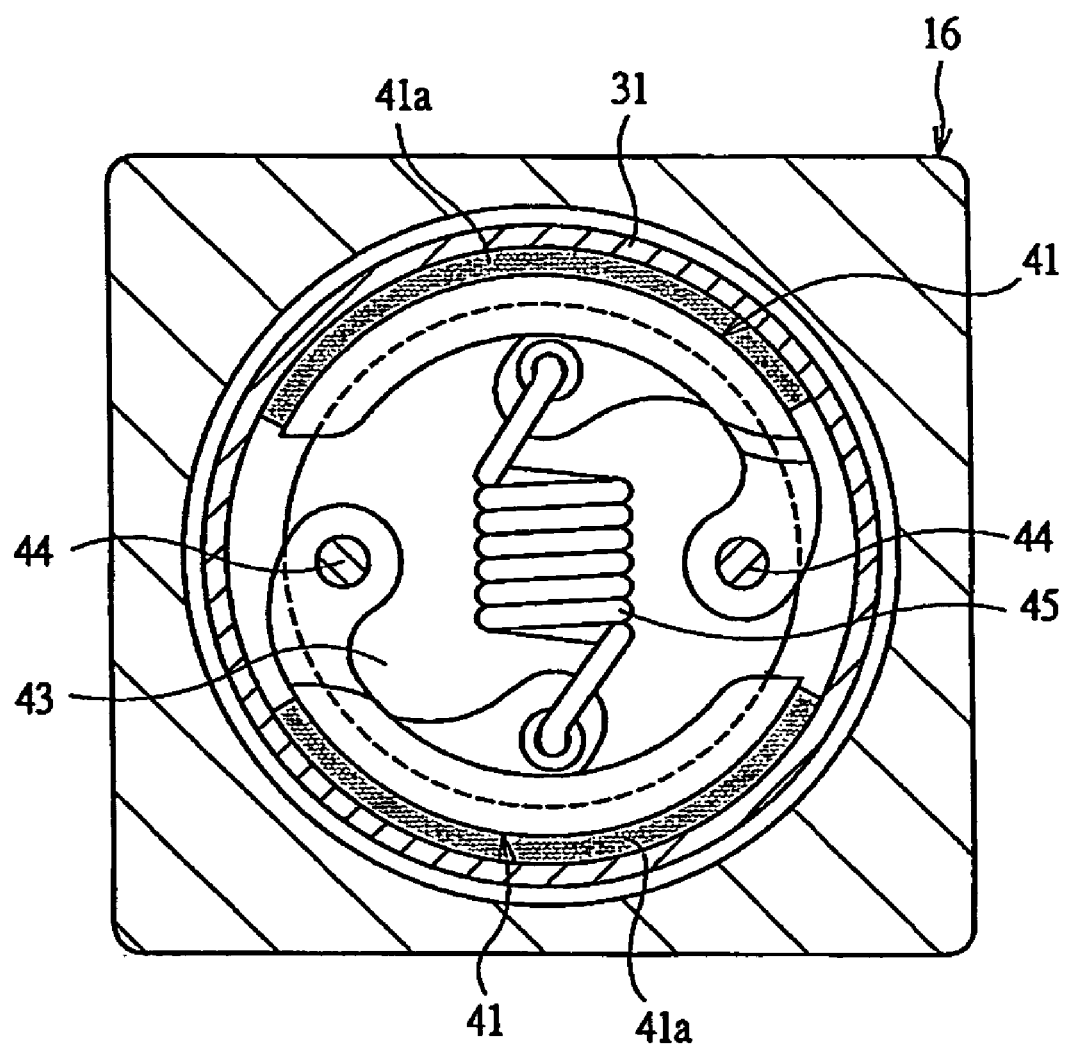
FIG. 11 is a transversal sectional view of the coupling portion of the driven side joint and the engine output side joint.

As shown in FIG. 2A and FIG. 3A, the tip of the engine output shaft 22 is provided with a pair of clutch shoes 41 as driving side coupling members of the engine. These clutch shoes 41 are incorporated in the engine output side joint 34 and, as shown in FIG. 2A, when the driven side joint 16 is fastened to the engine output side joint 34, these clutch shoes 41 are assembled into the clutch drum 31, whereby a centrifugal clutch 42 is formed between the driven shaft 11 and the engine output shaft 22. As shown in FIG. 2A and FIG. 11, the engine output side joint 34 is provided with a disk-shaped rotor plate 43 fixed to the engine output shaft 22, and the clutch shoes 41 are swingably attached to the rotor plate 43 by pins 44. Between the respective clutch shoes 41, an extension spring 45 is attached. By this extension spring 45, a spring force is applied to the clutch shoes 41 in a direction of isolating a friction contact portion 41a from an inner circumferential face of the clutch drum 31. When the number of revolutions of the engine 17 is increased, the clutch shoes 41 are expanded against the spring force of the expansion spring 45 due to a centrifugal force and are pressed to the inner circumferential face of the clutch drum 31 to be coupled to the clutch drum 31. In this way, the engine output shaft 22 becomes directly coupled to the driven shaft 11 through the centrifugal clutch 42. When the recoil knob 25 is pulled to start the engine 17, the centrifugal clutch 42 becomes opened. Therefore, the engine 17 can be easily started without applying any great resistance to the recoil knob 25.

Thus, when the driven side joint 16 provided to the operating arm 10 is fastened to the engine output side joint 34 provided in the engine 17, as shown in FIG. 1A, the engine 17 can be attached to the operating arm 10 as the main body of the bush cutter. Further, when the driven side joint 16 is fastened to the output side joint 34, the engine output shaft 22 is coupled to the driven shaft 11 through the centrifugal clutch 42, which comprises the clutch drum 31 and the clutch shoes 41. Therefore, the bush cutter can mow grass by rotationally driving the cutter 13 with the engine 17 used as a power source.

As shown in FIG. 2B and FIG. 3B, the tip of the motor output shaft 27 is provided with a pair of clutch shoes 46 serving as driving side coupling members of the motor. These clutch shoes 46 are incorporated in the motor output side joint 38 and, as shown in FIG. 2B, when the driven side joint 16 is fastened to the motor output side joint 38, these clutch shoes 46 are assembled into the clutch drum 31, whereby a centrifugal clutch 47 is formed between the driven shaft 11 and the motor output shaft 27. The clutch shoes 46 provided in the motor output side joint 38 are swingably attached to a rotor plate 48 fixed to the motor output shaft 27 by pins (omitted in Figures). Between the respective clutch shoes 46, an extension spring 51 is attached and, by this extension spring 51, a spring force is applied to the clutch shoes 46 in a direction of isolating a friction contact portion 46a from the inner circumferential face of the clutch drum 31. When the number of revolutions of the electric motor 18 is increased, the clutch shoes 46 are expanded against the spring force of the expansion spring 51 due to the centrifugal force and are pressed to the inner circumferential face of the clutch drum 31 to be coupled to the clutch drum 31. In this way, the motor output shaft 27 becomes directly coupled to the driven shaft 11 through the centrifugal clutch 47. When grass is entangled between the cutter 13 and the cover 14 and the number of revolutions of the electric motor 18 is reduced while remaining in a state of supplying the driving current from the battery 28, the engagement of the clutch shoes 46 with the clutch drum 31 is released, whereby any excess current is prevented from flowing in the electric motor 18.

Thus, when the driven side joint 16 is fastened to the motor output side joint 38, as shown in FIG. 1B, the electronic motor 18 can be attached to the operating arm 10 serving as the main body of the bush cutter. Further, when the driven side joint 16 is fastened to the motor output side joint 38, the motor output shaft 27 is fastened to the driven shaft 11 through the centrifugal clutch 47, which comprises the clutch drum 31 and the clutch shoes 46. Accordingly, the bush cutter can mow grass by rotationally driving the cutter 13 with the electric motor 18 used as a power source. Note that the reference numeral "52" shown in FIGS. 2A and 2B denotes a rubber seal member.

By such a structure, in the bush cutter according to the present invention, the worker can selectively attach any of the engine 17 and the electric motor 18 to one operating arm 10. Consequently, by preparing the main body of the bush cutter, that is, the operating arm 10 and preparing the engine 17 and the electric motor as respective attachments, the bush cutter can be used as any of an engine driving type and a motor driving type according to the use environment of the mowing operation. For example, at a place where no quietness is required, the mowing operation can be performed with the engine 17 used as a driving source, and at a place where quietness is required, the mowing operation can be performed with the electric motor 18 used as a driving source, so that the user can select the driving source according to the use environment. Further, if the user who has purchased the operating arm 10 and the engine 17 as one set additionally purchases the electric motor 18, the bush cutter can be switched to the electric type.

As shown in FIG. 3A, in order to regulate the number of revolutions of the engine 17, the engine 17 is provided with an engine revolution regulator 53. This engine revolution regulator 53 is coupled to the engine 17 by a cable unit 54 and, as shown in FIG. 1A, when the engine 17 is mounted on the operating arm 10, the regulator is detachably attached, as an accessory part for assisting the driving, to one of the handles 15 of the operating arm 10.

Figure 12A:
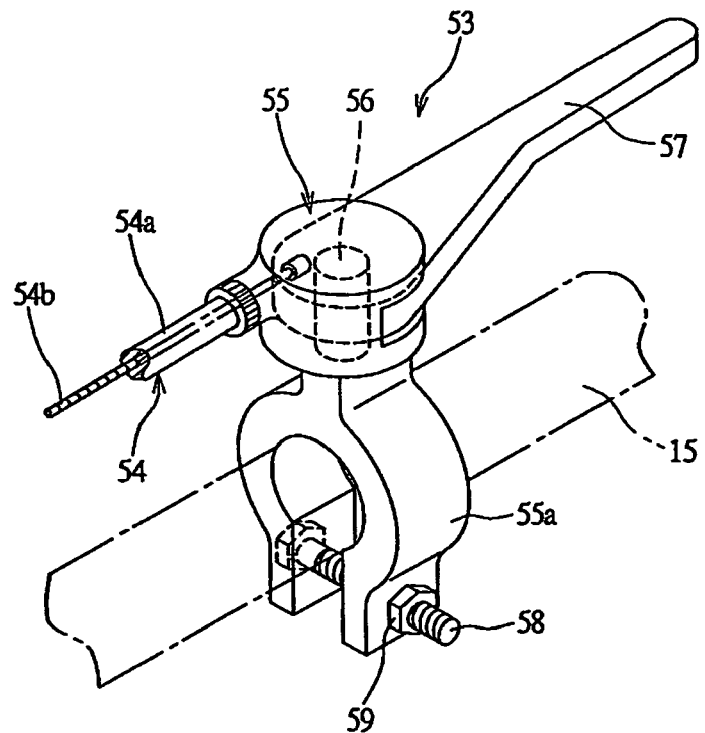
FIG. 12A is a perspective view showing details of an engine revolution regulator shown in FIG. 3A.

As shown in FIG. 12A, the engine revolution regulator 53 has a holder 55 and a lever 57 swingably supported to the holder 55 by a support pin 56. The cable unit 54 has a tube 54a with flexibility and a cable 54b movably accommodated in the tube 54a. One end of the cable 54b is connected to the lever 57, and the other end is connected to a throttle (omitted in Figures) of the engine 17. Further, one end of the tube 54a is fixed to the holder 55, and the other end is fixed to the engine case 21. In this way, a moving path length of the cable 54b between the holder 55 and the engine 17 is defined to be a predetermined length by the tube 54a. Consequently, by operating the lever 57, the throttle is operated to be opened and closed through the cable 54b, so that the number of revolutions of the engine 17 can be regulated.

The holder 55 is formed integrally with an attachment band portion 55a with an approximately C character in cross section, and a notched portion of the attachment band portion 55a is coupled by a bolt 58 and a nut 59. By disposing the attachment band portion 55a on the handle 15 and fastening the bolt 58 and the nut 59, the holder 55, that is, the engine revolution regulator 53 can be detachably attached to the handle 15 of the operating arm 10. When the holder 55 is attached to the handle 15, the lever 57 is disposed on a grip portion of the handle 15, so that the worker can regulate the number of revolutions of the engine 17 by operating the lever 57 while holding the grip portion of the handle 15.

On the other hand, as shown in FIG. 3B, in order to regulate the number of revolutions of the electric motor 18, the electric motor 18 is provided with a motor revolution regulator 61. This motor revolution regulator 61 is coupled to the electric motor 18 by an electric cord 62 and, as shown in FIG. 1B, when the electric motor 18 is attached to the operating arm 10, the regulator 61 is detachably attached, as an accessory part for assisting the driving, to one of the handles 15 of the operating arm 10.

Figure 12B:
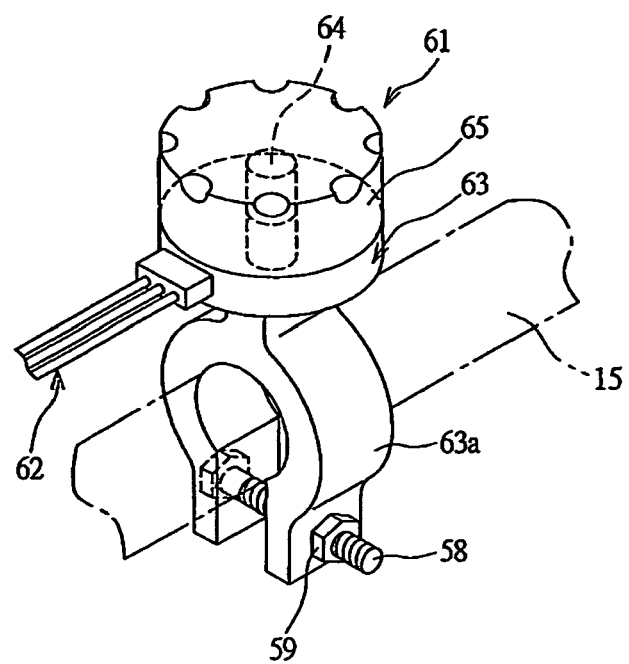
FIG. 12B is a perspective view showing details of a motor revolution regulator shown in FIG. 3B.
Figure 13:
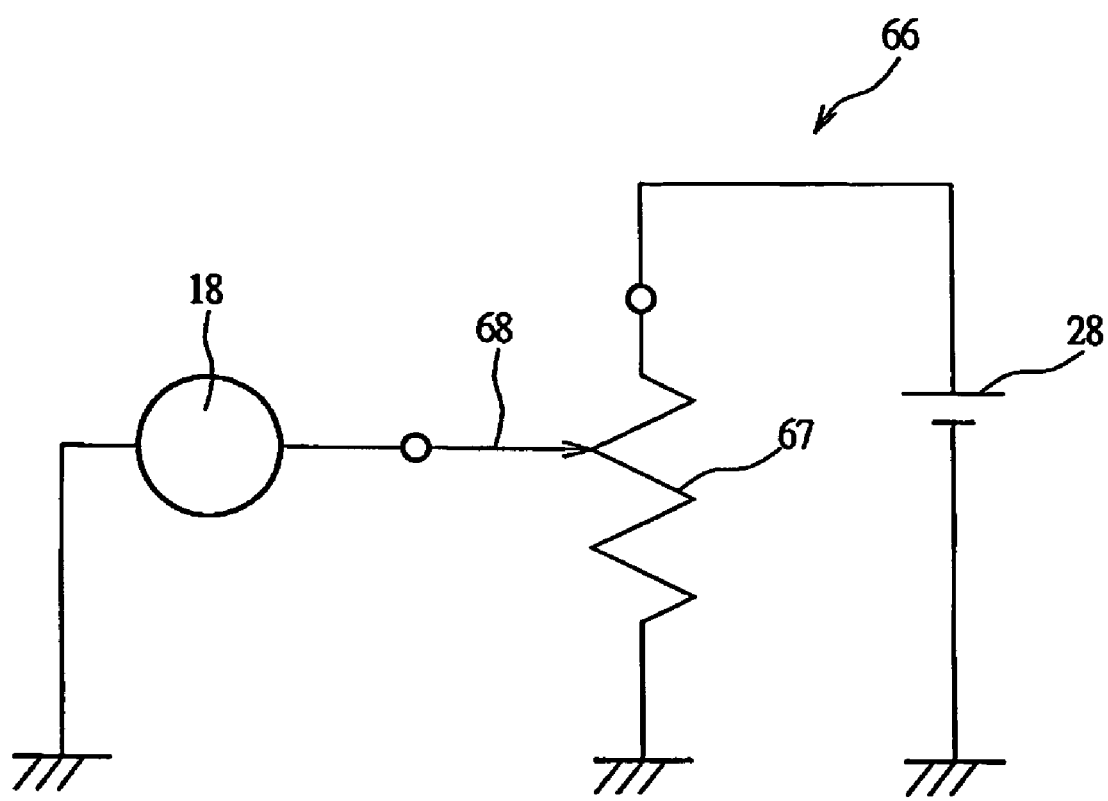
FIG. 13 is a circuit diagram of a variable resistor provided in the motor revolution regulator shown in FIG. 12B.

As shown in FIG. 12B, the motor revolution regulator 61 has a holder 63 and a regulation dial 65 as an operating member which is movably, that is, rotatably supported to the holder 63 by a support pin 64. The holder 63 is provided with a variable resistor 66 as shown in FIG. 13. The variable resistor 66 is connected to a controller (omitted in Figures) provided in the electric motor 18 through the electric cord 62, and has a resistor 67 to which a power supply voltage from the battery 28 is applied and a movable terminal 68 connected to the electric motor 18. The movable terminal 68 is fixed to the regulation dial 65 and movably contacts with the resistor 67. Consequently, by rotationally operating the regulation dial 65, a contact position with the resistor 67 of the movable terminal 68 can be changed, so that the driving current supplied to the electric motor 18 from the battery 28 is changed and the number of revolutions of the electric motor 18 can be regulated.

Incidentally, in the present embodiment, though the regulation dial 65 rotatably supported to the holder 63 as the operating member provided in the motor revolution regulator 61 is used, the dial is not limited to this and, for example, may use a slider and the like linearly reciprocably supported to the holder 63 as an operating member.

The holder 63 is formed integrally with an attachment band portion 63*a* with the same approximately C character in cross section as that of the holder 55 of the engine revolution regulator 53, and the holder 63, that is, the motor revolution regulator 61 is detachably attached to the handle 15 of the operating arm 10 by the bolt 58 and the nut 59 in the attachment band portion 63*a*. When the holder 63 is attached to the handle 15, the worker can regulate the number of revolutions of the electric motor 18 by operating the regulation dial 65 while holding the grip portion of the handle 15.

Thus, in this bush cutter, the engine revolution regulator 53 is coupled to the engine 17 by the cable 54*b*, and the motor revolution regulator 61 is coupled to the electric motor 18 by the electric cord 62. Therefore, when the engine 17 and the electric motor 18 are attached to the operating arm 10 as the main body of the bush cutter, operations for connecting these regulators 53 and 61 to the engine 17 and the electric motor 18 and an operation for the initial setting are not required, whereby such attaching operations can be easily performed. When the engine 17 is attached to the operating arm 10, the engine revolution regulator 53 is not required to regulate the number of idling revolutions of the engine 17, whereby such attaching operations of the engine 17 to the operating arm 10 can be easily performed. Since the motor revolution regulator 61 is always connected with the electric motor 18, a connection failure between the motor revolution regulator 61 and the electric motor 18 can be prevented when the electric motor 18 is attached to the operating arm 10.

Now, in such a bush cutter, a number of single blade type cutters 13 in which a cutting edge is provided at only a side face on one side of a rotational direction of the blade are used. However, when such a single blade type cutter 13 is mounted on the bush cutter to perform the mowing operation, the worker performs the mowing operation while the cutter 13 is moved right-handedly to left-handedly by returning the operating arm 10 to a position swung right-handedly and then swinging the operating arm 10 left-handedly from the position. After swinging the operating arm 10 once to perform the mowing operation, the worker advances and similarly performs the mowing operation while moving the cutter 13 right-handedly to left-handedly by returning the operating arm 10 right-handedly and then swinging it left-handedly. The worker repeats a swing reciprocation of the operating arm 10 until the mowing operation is completed at a predetermined mowing place. If the cutter 13 is rotated left-handedly when viewed from above, the mowed grass is brown away on left hand of the worker. If the mowing place is a slope such as a riverside, the worker performs the mowing operation while advancing and moving at almost the same height along the riverside. Therefore, when the mowing operation is performed in a left-down slope state, the mowed grass is brown away on a lower side of the slope.

However, when the mowing operation is performed by such a single blade cutter 13, the worker advances and moves until a terminal end of the mowing place and thereafter is required to return to the original place in order to perform the mowing operation of a region next to the previously mowed region. This is because if the mowing operation of the next region is performed by turning a worker's body reversely without returning to the original place, the mowed grass is brown away on an upper side of the slope on which grass sprouts in a reverse direction. For this reason, in order to blow away all the mowed grass on the lower side of the slope, the worker is required to return to the original place, which results in a problem of inefficient operability.

Figure 14:
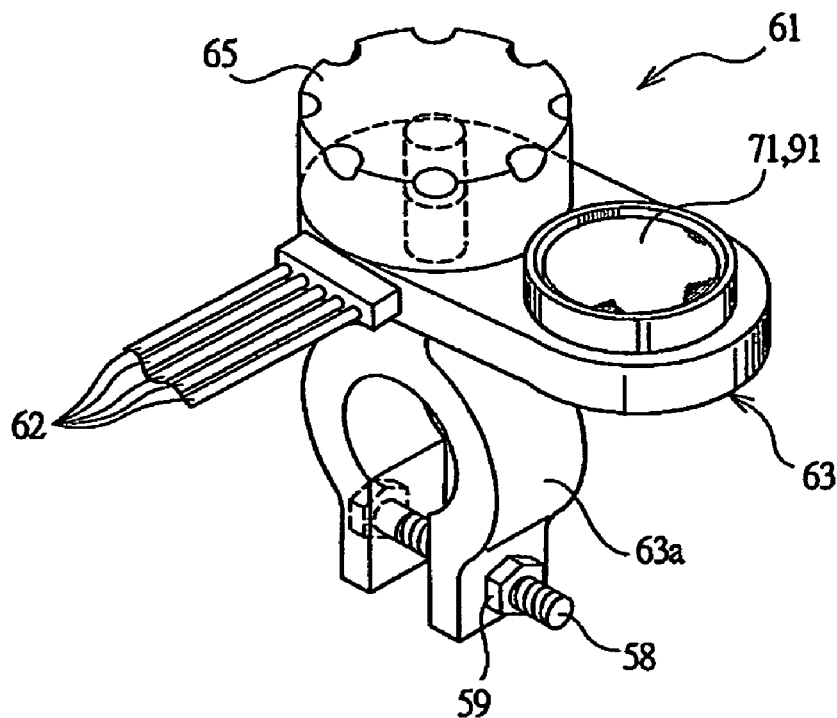
FIG. 14 is a perspective view showing a modified example of the motor revolution regulator shown in FIG. 12B.

Hence, in this bush cutter, as shown in FIG. 14, a selector switch 71 is provided in the electric motor 18, so that by operating this selector switch 71, the rotational directions of the electric motor 18 can be switched in a forward rotation or a reverse rotation in order to change the rotational direction of the cutter 13.

This selector switch 71 is provided so as to be adjacent to the motor revolution regulator 61 on the holder 63 of the motor revolution regulator 61 and is coupled to the electric motor 18 by the electric cord 62, so that when the electric motor 18 is attached to the operating arm 10, it is detachably attached, as an accessory part for assisting the driving, to one of the handles 15 of the operating arm 10 together with the motor revolution regulator 61.

As shown in FIG. 14, the selector switch 71 is a push button type switch capable of switching to two positions, i.e., a position connected to a forward-rotational contact point of a forward-reverse switching circuit of the electric motor 18 and a position connected to a reverse-rotational contact point thereof, so that it holds the connected position until the selector switch 71 is depressed again. When the selector switch 71 is connected to the forward-rotational contact point, the cutter 13 is driven in the forward-rotational direction as shown by, for example, an arrow "N" in FIG. 1B and when the selector switch 71 is connected to the reverse-rotational contact point, the cutter 13 is driven in the reverse-rotational direction as shown by an arrow "R". Each rotational direction is retained until the selector switch 71 is depressed again.

In this way, when the mowing operation is performed by rotationally driving the cutter 13 by the electric motor 18, the selector switch 71 is operated by a finger tip while grasping the handles 15, so that the cutter 13 can be rotated in any of the forward and reverse directions.

Incidentally, the shape and structure of the selector switch 71 are not limited to those shown in Figures, and may be of a slide type, a lever type, or a rotational type if the rotational direction of the electric motor 18 can be changed to any of the forward and reverse directions by the operation of the worker.

Figure 16A:
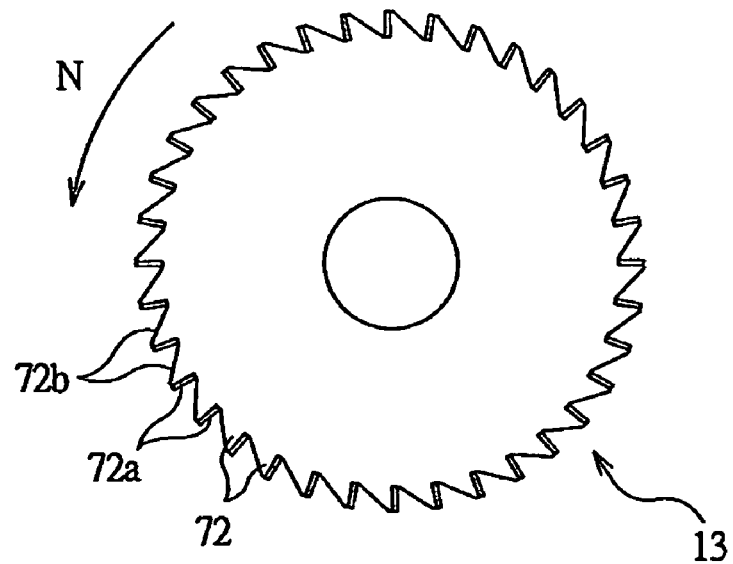
FIG. 16A is a top view of a single blade type cutter.

A cutter 13 used in the bush cutter in which the rotational direction of the electric motor 18 cannot be changed includes a single blade type as shown in FIG. 16A. In this cutter 13, a plurality of saw-toothed blades 72 are provided on an outer circumferential portion of a metal disk, and each of the blades 72 has a cutting edge 72a formed on a rotational-directional front side of the cutter 13 and extending radially and an inclined plane 72b formed in a rotational-directional rear side thereof, wherein the cutting edges are not formed on the inclined plane 72b and the cutting edges 72a are formed only in one of the rotational directions.

Figure 16B:
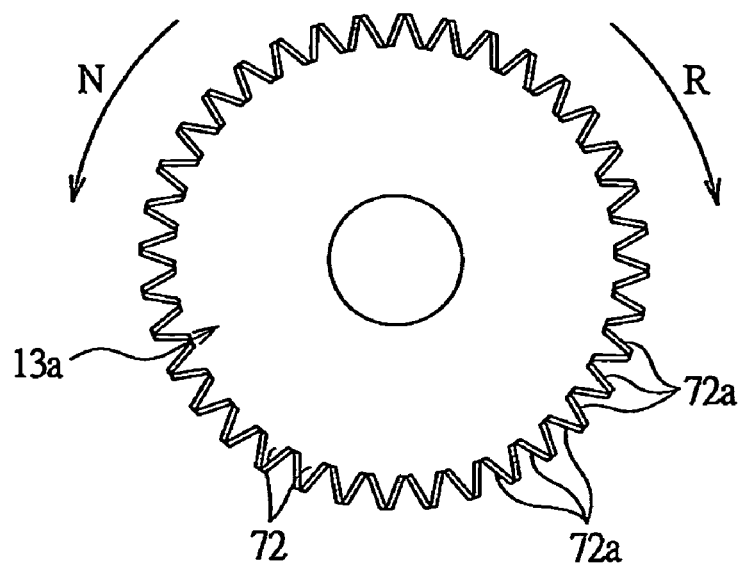
FIG. 16B is a top plan of a double blade type cutter.

In contrast to this, a cutter used in the bush cutter comprising the selector switch 71 shown in FIG. 14 includes the cutter 13a having blades of a double blade type as shown in FIG. 16B. In the double blade type cutter 13a, each of blades 72 is provided on the outer circumferential portion of the metal disk, and in each blade 72, a cutting edge 72a is formed in each of the forward and reverse directions of the cutter 13a.

Any of the cutters 13a of the single blade type and the double blade type as shown in FIGS. 16A and 16B can be mounted on the operating arm 10, and the mowing operation and the like can be performed by using any of the engine 17 and the electric motor 18 as a power source. However, in the case of the bush cutter to which the electric motor 18 comprising the selector switch 71 as shown in FIG. 14 is attached, the cutter 13a of the double blade type is used, so that the mowing operation can be performed even if the electric motor 18 is rotated in any of the directions.

Next, a description will be made on the case where the bush cutter having such a selector switch 71 is used to perform a mowing operation to a rectangular grass place with left and right side edges 81 and 82 and front and rear end edges 83 and 84.

Figure 17A:
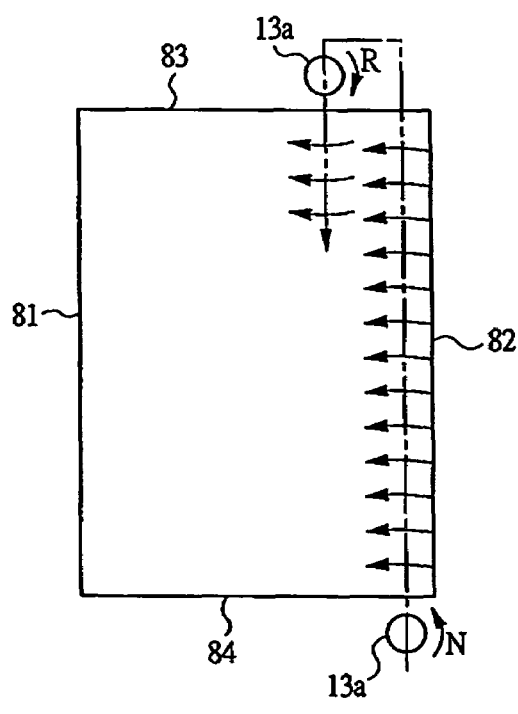
FIG. 17A is a schematic diagram showing a mowing operation procedure by the double blade type cutter.

In FIG. 17A, in case the mowing operation is performed from a region close to the right-handed side edge 82, while the cutter 13a is rotated in the forward direction as shown by the arrow "N" from the end edge 84 that is on an operation start side, the worker performs first the mowing operation so that the operating arm 10 is returned right-handedly as shown by a circular-arc arrow and thereafter is swung right-handedly to left-handedly to move the cutter 13a right-handedly to left-handedly. After having performed the mowing operation by swinging the operating arm 10 in this way, the worker advances and moves along the side edge 82, similarly returns the cutter 13a right-handedly, and then moves the cutter 13a left-handedly, thereby performing the mowing operation. In this way, by repeating the operation for swinging the operating arm 10 left-handedly and right-handedly and the advancing movement of the worker, the mowing operation is being carried out.

In this mowing operation, the mowed grass is blown away on a side of the left-handed side edge 81, as shown in FIG. 17A. When the mowing operation proceeds to the end edge 83 that is on an operation termination side, the worker reverses his posture, makes the rotational direction of the cutter 13a reverse (in the direction of the arrow "R") by operating the selector switch 71, and performs the mowing operation when the cutter 13a is moved from left to right hands of the advancing direction as shown in FIG. 17A. At this time, since the cutter 13a is reversed, the mowed grass is blown away on the right hand of the advancing direction, so that the mowed grass is blown away on a side of the side edge 81 similarly as described above. In this way, in case the mowing operation is performed, even when the mowing operation is performed in such reciprocating movement as to advance to the end edge 83 that is on the operation termination side from the end edge 84 that is on the operation start side and to return in the reserve direction, the mowed grass can be blown away on a side of the side edge 81 in both cases.

Figure 17B:
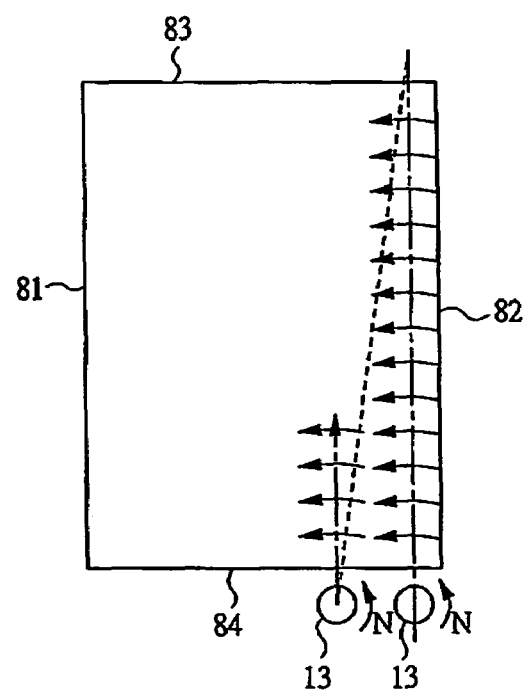
FIG. 17B is a schematic diagram showing a mowing operation procedure by the single blade type cutter.

In contrast to this, as shown in FIG. 17B, in case the single blade cutter 13 is attached to the bush cutter to perform the mowing operation, the cutter 13 is rotated in the forward direction to perform the mowing operation. Therefore, while the bush cutter is moved from the end edge 84 to the end edge 83 that is on a return side, the mowing operation is performed by blowing away the mowed grass on a side of the side edge 81. Then, in order to blow away the mowed grass on a side of the side edge 81 when the mowing operation to a region next to the region where the mowing operation has been completed is performed, the mowed grass is blown away on a side of the side edge 82 if the mowing operation is performed by turning the cutter reversely. Hence, the worker is required to return to the position of the end edge 84 that is on the original start side and as shown by a broken line, so that the mowing operation can be performed only during the return.

Consequently, when the mowing operation is performed by rotating the cutter 13a of the double blade type by the electric motor 18, the cutter 13a is rotated in both the forward and reverse directions, so that the mowed grass can be gathered on one side. Particularly, in case the mowing bush place is a slope such as a riverside in which the side edge 82 in FIGS. 17A and 17B is high, the worker can gather the mowed grass on the lower side even during any of the reciprocating movement, whereby mowing operability of the cutter becomes better.

In this way, in the bush cutter, when the cutter 13a is driven by the electric motor 18, the cutter 13a having a blade in which cutting edges are formed even in the forward direction and the reverse direction can be selectively rotated also in any of the forward direction and the reverse direction. Accordingly, the blowing direction of the mowed grass can be set on any of the left and right hands, whereby the mowing operability can be enhanced.

In this bush cutter, as shown in each of FIGS. 1A and 1B, a cover 14 for covering a worker's side of the cutter 13 is mounted on the operating arm 10 to ensure safety of the worker. For this reason, the mowed grass such as cut weeds and the like are sometimes entangled between the cutter 13 and the cover 14, so that the cutter 13 is locked and stops rotating in some cases. There are also the cases where the grass and the like unable to be cut out are entangled into the cover 14 or a rotary shaft of the cutter 13 or where foreign matters such as trees and the like are bitten into the blade so that the cutter 13 is locked. When the cutter 13 is locked by the mowed grass and the like in this way, the mowed grass and the like entangled into the cutter 13 are required to be removed by reversing the cutter 13 by a manual operation, after stopping an operation of a power source. Therefore, it is difficult to easily and safely perform the mowed grass removal operation.

Hence, in this bush cutter, instead of the selector switch 71 as shown in FIG. 14, a lock releasing switch 91 as the selector switch is provided in the electric motor 18 and, by operating this lock releasing switch 91, the electric motor 18 is reversed so as to be able to easily release the lock of the cutter 13.

This lock releasing switch 91, similarly to the selector switch 71, is also provided in the holder 63 of the motor revolution regulator 61 so as to be adjacent to the motor revolution regulator 61, and is coupled to the electric motor 18 by the electric cords 62. When the electric motor 18 is attached to the operating arm 10, the lock releasing switch 91 is detachably attached, as an accessory part for assisting its driving, to one of the handles 15 of the operating arm 10 together with the motor revolution regulator 61.

Although the selector switch 71 shown in FIG. 14 is held at the forward position or reverse position every time the switch is operated, the lock releasing switch 91 is biased by an unshown spring member so as to be always connected to the forward-directional contact point of the motor. When the switch is depressed by the worker, it contacts with the reversedirectional contact point of the motor driving circuit to reverse the electric motor 18. That is, the lock releasing switch 91 allows the electric motor 18 to rotate reversely as long as it is depressed by the worker. Therefore, when the above switch is not operated by the worker, it allows the electric motor 18 to rotate in the forward direction.

Figure 15:
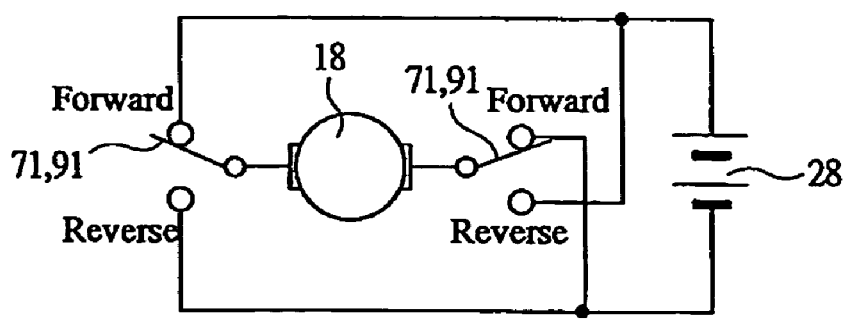
FIG. 15 is a circuit diagram of a selector switch shown in FIG. 14.

Although a circuit structure of this lock releasing switch 91 is the same as the circuit of the selector switch 71 shown in FIG. 15, a reverse circuit is not limited to the circuit shown in Figure and may be such that when the lock releasing switch 91 is depressed once, the electric motor 18 is reversed by the predetermined number of rotations, for example, by only one rotation or the electric motor 18 is reversed for only a few seconds. Further, the shape and structure of the lock releasing switch 91 are not limited to those shown in Figure, and may be a slide type, a lever type, a rotary type, and the like if it can send the reverse current to the electric motor 18 by the operation of the worker.

In this way, in this bush cutter, when the cutter 13 is rotationally driven by the electric motor 18 to perform the mowing operation, if the mowed grass is entangled into the cutter 13 or the foreign matters are bitten into the cutter 13 so that the cutter 13 is locked, the rotational direction of the electric motor 18 can be reversed by the predetermined number of revolutions or for a predetermined period of time by operating the lock releasing switch 91. Thereby, the mowed grass and the like entangled into the cutter 13 can be easily and safely removed, whereby improvement of the operability can be achieved.

The present invention is not limited to the foregoing embodiments, and can be variously modified without departing from the spirit and scope of the invention. For example, the invention can be also applied to a bush cutter of a direct-acting type in which a driving source and a cutter driven by this driving source are attached to the tip of the operating arm 10, that is, an operating lever. In that case, the engine and the electric motor are selected and attached to a housing mounted on the tip of the operating arm 10. Further, the present invention can be also similarly applied to a bush cutter of a type in which a driving source and a cutter are attached to a traveling wagon.

Further, the fastening member is not limited to the structure shown in FIG. 1, and may adopt such a structure as to be capable of selectively fastening the driven side joint 16 to any of the engine output side joint 34 and the motor output side joint 38. For example, a lever having a claw portion is swingably attached to a tip of a link swingably attached to the driven side joint 16, and a protrusion engaged with the claw portion provided in the lever may be formed at the engine output side joint 34 or the motor output side joint 38. Further, a sleeve is rotatably attached to the outside of the driven side joint 16, and a male screw to engage with a female screw formed in the inner circumferential face of the sleeve may be provided in the engine output side joint 34 or the motor output side joint 38.

Further, a coupling structure of the driving side coupling portion and the driven side coupling portion is not limited to the centrifugal clutch and, for example, may use an engaging type clutch and the like.

What is claimed is:

1. A bush cutter for cutting grass by rotating a cutter, comprising: a main body of the bush cutter;
a cutter holder mounted on the main body and rotatably supporting the cutter;
a drive shaft rotatably supported to the main body and coupled to the cutter;
a power source selectively composed of an engine or an electric motor;
a drive side joint mounted on the main body and detachably attached to any one of an engine output side joint provided in an engine case accommodating the engine and a motor output side joint provided in a motor case accommodating the electric motor;
a drive side coupling member coupled to the drive shaft in the drive side joint and coupled to any one of a drive side coupling member of the engine provided to an output shaft of the engine and a drive side coupling member of the motor provided to an output shaft of the electric motor; and
a detachable and attachable accessory part provided so as to correspond to the engine or electric motor selectively mounted and assisting its driving, wherein said accessory part is detachable from said main body while said accessory part still being connected to the engine or the electric motor when the drive side joint is released from any one of the engine output side joint and the motor output side joint.

2. The bush cutter according to claim 1, further comprising:
a battery attached at a time of selectively mounting the electric motor on the main body of the bush cutter, wherein the battery is attached to the electric motor in a sliding manner in parallel with the output shaft of the electric motor.

3. The bush cutter according to claim 1, wherein the accessory part is an engine revolution regulator attached at a time of selectively mounting the engine on the main body of the bush cutter, the engine revolution regulator being coupled to a throttle of the engine and capable of regulating the number of revolutions of the engine.

4. The bush cutter according to claim 3, wherein the engine revolution regulator is detachably attached to the main body of the bush cutter and is coupled to the throttle by a cable.

5. The bush cutter according to claim 4, where the engine revolution regulator comprises a holder detachably attached to the main body of the bush cutter and a lever swingably supported to the holder and connected to the cable.

6. The bush cutter according to claim 1, wherein the accessory part is a motor revolution regulator attached at a time of selectively mounting the electric motor on the main body of the bush cutter, the motor revolution regulator being coupled to the electric motor and capable of regulating the number of revolutions of the electric motor.

7. The bush cutter according to claim 6, wherein the motor revolution regulator is detachably attached to the main body of the bush cutter and is coupled to the electric motor by an electric cord.

8. The bush cutter according to claim 7, wherein the motor revolution regulator comprises a holder detachably attached to the main body of the bush cutter; an operating member movably supported by the holder; and a variable resistor operated by the operating member and changing a driving current supplied from a battery to the electric motor.

9. The bush cutter according to claim 1, wherein the cutter has a blade of a double blade type, and the accessory part is a selector switch attached at a time of selectively mounting the electric motor on the main body of the bush cutter, the selector switch changing a rotational direction of the electric motor.

10. The bush cutter according to claim 9, wherein the selector switch is detachably attached to a handle of the main body of the bush cutter, and is coupled to the electric motor through an electric cord.

11. The bush cutter according to claim 1, wherein the accessory part is a selector switch attached at a time of selectively mounting the electric motor on the main body of the bush cutter, the selector switch reversing the electric motor when the cutter is locked.

12. The bush cutter according to claim 11, wherein the selector switch is detachably attached to the handle of the bush cutter, and is coupled to the electric motor through the cable.

13. A bush cutter for cutting grass by rotating a cutter, comprising: a main body of the bush cutter;
   a cutter holder mounted on the main body and rotatably supporting the cutter;
   a drive shaft rotatably supported to the main body and coupled to the cutter;
   a power source selectively composed of:
      (1) an engine having an detachable engine revolution regulator being coupled to a throttle of the engine and capable of regulating the number of revolutions of the engine, or
      (2) an electric motor having a detachable motor revolution regulator being coupled to the electric motor and capable of regulating the number of revolutions of the electric motor;
   a drive side joint mounted on the main body and detachably attached to any one of an engine output side joint provided in an engine case accommodating the engine and a motor output side joint provided in a motor case accommodating the electric motor; and
   a drive side coupling member coupled to the drive shaft in the drive side joint and coupled to any one of a drive side coupling member of the engine provided to an output shaft of the engine and a drive side coupling member of the motor provided to an output shaft of the electric motor;
   wherein the power source is released from the drive side joint while said power source still being connected to any one of the detachable engine revolution regulator and the detachable motor revolution regulator.

14. The bush cutter according to claim 13, further comprising:
   a battery attached at a time of selectively mounting the electric motor on the main body of the bush cutter, wherein the battery is attached to the electric motor in a sliding manner in parallel with the output shaft of the electric motor.

15. The bush cutter according to claim 13, wherein the engine revolution regulator is detachably attached to the main body of the bush cutter and is coupled to the throttle in the engine by a cable provided out of the main body.

16. The bush cutter according to claim 7, wherein the motor revolution regulator is detachable attached to the main body of the bush cutter and is coupled to the electric motor by an electric cord provided out of the main body.

17. The bush cutter according to claim 13, further comprising:
   a handle provided on the main body of the bush cuter and gripped by a user during use;
   a selector switch for changing a rotation direction of the electric motor or reversing the electric motor,
   wherein the selector switch is detachably attached to the handle, and the electric motor is releasable from the drive side joint with connecting to the selector switch through an electric cord provided out of the main body.

18. The bush cutter according to claim 13, further comprising: a holder detachably attached to the main body of the bush cutter;
   an operating member movably supported by the holder;
   a variable resistor operated by the operating member and changing a driving current supplied from a battery to the electric motor; and
   a selector switch changing a rotation direction of the electric motor or reversing the electric motor, said selector switch is provided to the holder.

19. A bush cutter, comprising:
   a main body of the bush cutter;
   a cutter;
   a drive shaft rotatably supported to the main body and coupled to the cutter; a power source selectively composed of:
      (1) an engine having a detachable engine revolution regulator being coupled to a throttle of the engine and capable of regulating the number of revolutions of the engine, or
      (2) an electric motor having a detachable motor revolution regulator being coupled to the electric motor and capable of regulating the number of revolutions of the electric motor;
   a drive side joint mounted on the main body and detachably attached to any one of an engine output side joint provided in an engine case accommodating the engine and a motor output side joint provided in a motor case accommodating the electric motor; and
   a drive side coupling member coupled to the drive shaft in the drive side joint and coupled to any one of a drive side coupling member of the engine provided to an output shaft of the engine and a drive side coupling member of the motor provided to an output shaft of the electric motor,
   wherein when the engine is selected as the power source, the engine revolution regulator connects to the engine by a cable provided out of the main body upon detachment of the drive side joint and the engine output side joint, and when the electric motor is selected as the power source, the motor revolution regulator connects to the electric motor by an electric cord provided out of the main body upon detachment of the drive side joint and the motor output side joint.

20. The bush cutter according to claim 1, wherein said engine and electric motor each being separately selectable before each use of said bush cutter by an end user thereof.

21. The bush cutter according to claim 13, wherein said engine and electric motor each being separately selectable before each use of said bush cutter by an end user thereof.

22. The bush cutter according to claim 19, wherein said engine and electric motor each being separately selectable before each use of said bush cutter by an end user thereof.

23. The bush cutter according to claim 1, wherein said accessory part is designed to be connected to the bush cutter by a holder and disconnected from said bush cutter without damage.

24. The bush cutter according to claim 13, wherein said accessory part is designed to be connected to the bush cutter by a holder and disconnected from said bush cutter without damage.

25. The bush cutter according to claim 10, wherein said accessory part is designed to be connected to the bush cutter by a holder and disconnected from said bush cutter without damage.

* * * * *